April 17, 1956

C. R. THIEME 2,742,193

SLIDE VALVE ADAPTED FOR ACCURATE CONTROL OF THE FLOW
OF FINELY DIVIDED GRANULAR SOLID MATERIALS
Filed April 29, 1952

Charles R. Thieme Inventor

By Edwin M. Thomas Attorney

United States Patent Office 2,742,193
Patented Apr. 17, 1956

2,742,193

SLIDE VALVE ADAPTED FOR ACCURATE CONTROL OF THE FLOW OF FINELY DIVIDED GRANULAR SOLID MATERIALS

Charles R. Thieme, Linden, N. J., assignor to Esso Research and Engineering Company, a corporation of Delaware Application April 29, 1952, Serial No. 285,008

6 Claims. (Cl. 222—148)

The present invention relates to a slide valve and particularly a slide or piston type valve adapted for accurate control of the flow of finely divided granular solid materials.

In the control of finely divided solids such as silicious and other granular catalysts, as used in chemical industries and particularly in petroleum cracking and other refining operations, numerous problems have been encountered. Finely divided solid materials are highly abrasive and they tend rapidly to wear away control apparatus. Furthermore, since they often include extremely fine particles which sift and otherwise work their way into crevices, etc., control valves and the like are often jammed and rendered inoperative after a period of use. Thus, in the control of so-called fluidized solids in chemical or catalytic operations, slide valves become jammed or they bind so as to be operable only with great difficulty due to the sifting of fine solids around the operating parts. This condition is aggravated by the abrasion of the flowing solid materials which tend to wear away the edges and other extremities of the immovable elements, thus affording a means for entrance of the finely divided material between slide elements and the like. The friction between sliding parts laden with finely divided silica and the like becomes very high and occasionally renders these parts completely immovable.

An object of the present invention is to design a slide valve of the piston or plunger type which is substantially free from tendencies to bind or jam due to the presence of finely divided granular solids. Other objects of the invention will become more fully apparent from a consideration of a detailed embodiment thereof. Accordingly, reference is made to the acompanying drawings which form a part of this specification.

Figure 1:
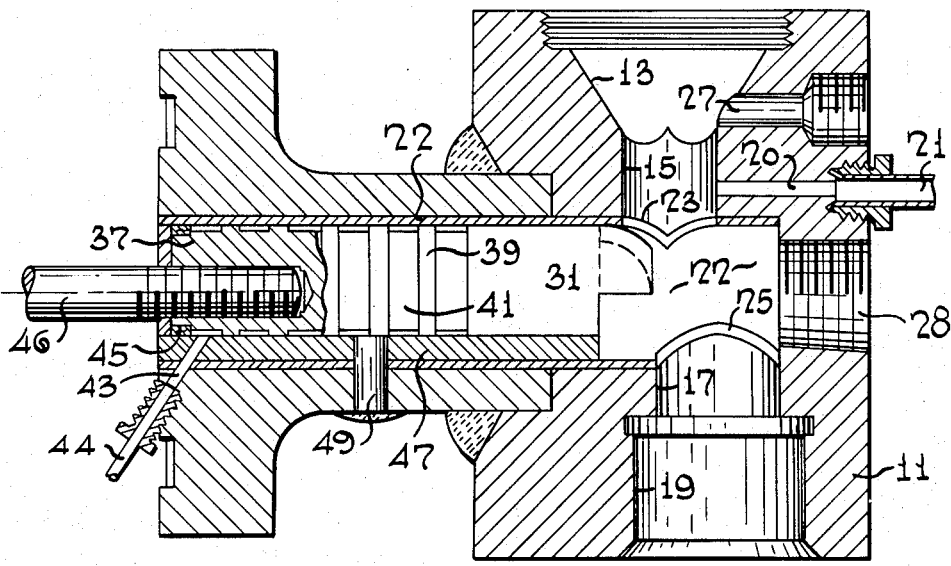
Figure 1 is a vertical sectional view through a slide or piston type valve embodying the present invention.

The valve illustrated in the drawings comprises a body portion 11 which is provided with a generally vertical passageway 13 through which solids may flow, from top to bottom as shown in the figure. Obviously flow may be in any direction provided a suitable impelling force is available. For gravity flow the valve should be arranged more or less as in Figure 1. The vertical passage 13 at the top of the valve converges into an angular throat 15 which, in the embodiment shown, is a square or rectangular opening in cross-section. At its lower portion the valve is provided with a larger opening 17 which opens up into a still larger passage 19. A gas inlet 20 is provided by which air or other gas may be blown in continuously or at intervals through an opening 21 to prevent bridging or clogging of the throat by the powdered or other finely divided solids.

In effect, the portions 13, 15, 17 and 19 form a passage which is intersected by a transverse sleeve element 22. This sleeve element is formed preferably of a high grade steel such as cutlery steel, which is highly resistant to abrasion. Other materials may be used for less abrasive solids. The sleeve 22 has an opening 23 in the upper or upstream portion thereof which matches the opening or passageway 15 previously mentioned. Another opening 25 which may be of circular or angular cross-section is provided in the lower or downstream portion of sleeve 23 in general alignment with the passageway 17 previously mentioned. The valve body 11 also is provided with an opening 27 for admission of gasiform, liquid or fluidized material in a side stream. Valve body 11 is also provided with a threaded bore 28 which may be used like opening 27, that is, for admission of gasiform, liquid or fluidized material in a side stream, or the threaded bore 28 may be closed off by a threaded plug.

By control of the upstream port 23 the flow of finely divided solids or other matter through the valve may be strictly and accurately controlled.

Figures 2, 3:
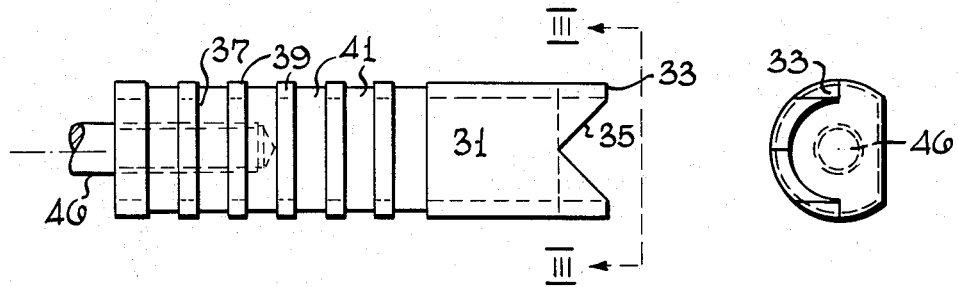
Figure 2 is a top or plan view of the slide or piston element of Figure 1.
Figure 3 is an end view of the element of Figure 2 as viewed from the right.

Closely fitted in sliding relationship within the sleeve 22 is a closure piston or plunger member 31. As best shown in Figures 2 and 3 the piston 31 has an overhanging extension 33 which is notched as at 35 for accurate control of flow through the port 23 previously mentioned. The notch 35 coincides with the leftward portion of opening 23 as seen in Figure 1 when the piston is fully withdrawn to the left as shown in Figure 1.

The piston 31 is the end or terminal portion of a plunger structure 37 which is provided with a series of circumferential rib members 39 separated by grooves or relieved annular portions 41. In the handling of finely divided solids with the valve piston 31 fully withdrawn or partially or entirely closing the opening 23 fine solid matter inevitably will tend to sift into the smallest space surrounding the piston head 31. This can be reduced by means described below, but cannot be entirely prevented in some cases. If this fine solid matter were allowed to accumulate for any substantial distance or in substantial quantity along the enclosed portion of the plunger structure, friction would be so great as to render operation of the valve very difficult and even impossible. With the alternate ribs and grooves 39 and 41, however, any fine solids which work their way back into the plunger and sleeve are scraped off by the ribs, falling into the grooves or relieved portions. The valve piston may be withdrawn entirely from the sleeve on occasion, if desired, to scrape out the accumulated fine solids and restore normal free operation of the plunger and piston element. Additional means are provided, however, for keeping the plunger free from such undesirable loading.

In order to minimize accumulation of fine solids within the grooves 41 of the plunger, a sealing fluid, preferably gas, may be introduced into an inlet port 43 which extends through the sleeve 22 and through an insert member 47 described below. This is a highly desirable feature. Air or other pressure fluid may be supplied through a connection 44, from any convenient source, not shown. By this means, the accumulation of finely divided solids, powder, etc., in the grooves 41 is very substantially reduced and almost eliminated. The fluid pressure, of course, should be greater than opposing fluid or static pressure at the throat 13, 15. Such material as does accumulate within the grooves 41 does not interfere with operation of the valve. A packing gland 45 of suitable type is provided around the outer end plunger 37 to prevent outward leakage of the sealing gas or other fluid introduced into inlet port 43.

An operating mechanism of any suitable type, not shown, is connected to the plunger 37 by a control rod or connection 46.

Another feature of the invention is the supporting insert slide member 47 which in cross-section is a small or minor segment of a circle. The slide insert 47 is made preferably of high grade tool steel for highly abrasive solids or of other abrasion resistant material in other cases. It is fitted in the lower or downstream side of the sleeve 22. A rivet or bolt 49 or equivalent locking device holds the slide insert in position so that the plunger piston assembly 31, 37 is always restrained against accidental rotation and other misalignment with the inlet port 23. The parts 22, 31, 37 and 47 are all carefully machined for a close sliding fit of the piston-plunger unit so that the flow and slides may be controlled to a highly accurate degree. The notch 35 in the overhanging lip portion 33 of piston 31 forms a weir type metering device for highly accurate flow control.

It will be obvious that other modifications may be made without departing from the spirit of the invention. The salient features, however, are the accurately fitted sleeve and sliding portions mentioned above, and the counterflow fluid sealing pressure around the plunger, plus the alternate circumferential ribs and grooves on the plunger itself which make the valve self-cleaning and freely operable for accurate control operations. The particular structure shown and described above has special and outstanding utility in the handling of finely divided solids such as silicious catalysts and the like.

What is claimed is:

1. In combination, a valve body member having a throat passage for finely divided solid material such as silicious catalysts and the like, means for supplying a fluid to said throat to prevent bridging of said solid material therein, a hollow sleeve member extending transversely across said passage and having an angular opening facing upstream and another opening down stream, a slidable stud closure element closely fitted in said sleeve member and provided with a notched extension for cooperation with said angular opening to control accurately the flow of said material through said opening, and means including a series of grooves and ribs on said stud closure element for preventing accumulation of said solid material around said stud closure element to an extent sufficient to interfere with operation thereof.

2. Combination according to claim 1 wherein means are provided for supplying a sealing fluid under pressure around said closure element to reduce accumulation of solids in said grooves, thereby preventing jamming or binding of said stud closure element in said sleeve.

3. In combination, a slide valve body member having a longitudinal passage for permitting free flow of finely divided solids, means for supplying an aerating gas to said passage to prevent clogging thereof by said solids, a transverse cylindrical sleeve of highly abrasion-resistant material intersecting said passage, openings in upstream and downstream portions of said sleeve, a circumferentially grooved plunger adapted to slide freely within said sleeve in the presence of finely divided solids without jamming, said plunger being provided at its one end with a highly abrasion-resistant piston portion closely fitted in said sleeve and adapted to be projected across said upstream opening for accurate control of flow of solids therethrough.

4. Combination according to claim 3 wherein a plane slide insert is provided within said sleeve and said plunger and piston portion are cut away on the downstream side and supported on said plane slide insert.

5. Combination according to claim 3 wherein means are provided for supplying a sealing fluid under pressure around said plunger to impede accumulation of said solids in the grooves thereof.

6. In combination, a valve body member having a throat passage for finely divided solid material such as silicious catalysts and the like, means for supplying a fluid to said throat passage to prevent bridging of solid material therein, a hollow sleeve member extending transversely across said passage and having an opening facing upstream and another opening facing downstream, a slidable stud closure element closely fitted in said sleeve and provided with a piston portion for cooperation with said upstream opening to control the flow of solid material through said upstream opening, and means including a series of grooves and ribs on said stud closure element for preventing accumulation of solid material around said stud element to an extent sufficient to interfere with operation thereof.

References Cited in the file of this patent

UNITED STATES PATENTS

| 1,471,107 | Darling | Oct. 16, 1923 |
| 1,885,338 | Estep | Nov. 1, 1932 |
| 1,908,396 | Albright | May 9, 1933 |
| 2,229,601 | Park | Jan. 21, 1941 |
| 2,283,556 | Karrick | May 19, 1942 |
| 2,315,058 | Holt | Mar. 30, 1943 |
| 2,485,316 | Robbins | Oct. 18, 1949 |

FOREIGN PATENTS

| 296,503 | Great Britain | Sept. 6, 1928 |